(No Model.)
J. N. B. BOND.
APPARATUS FOR THE MANUFACTURE OF FERTILIZERS FROM OFFAL, &c.
No. 270,003. Patented Jan. 2, 1883.
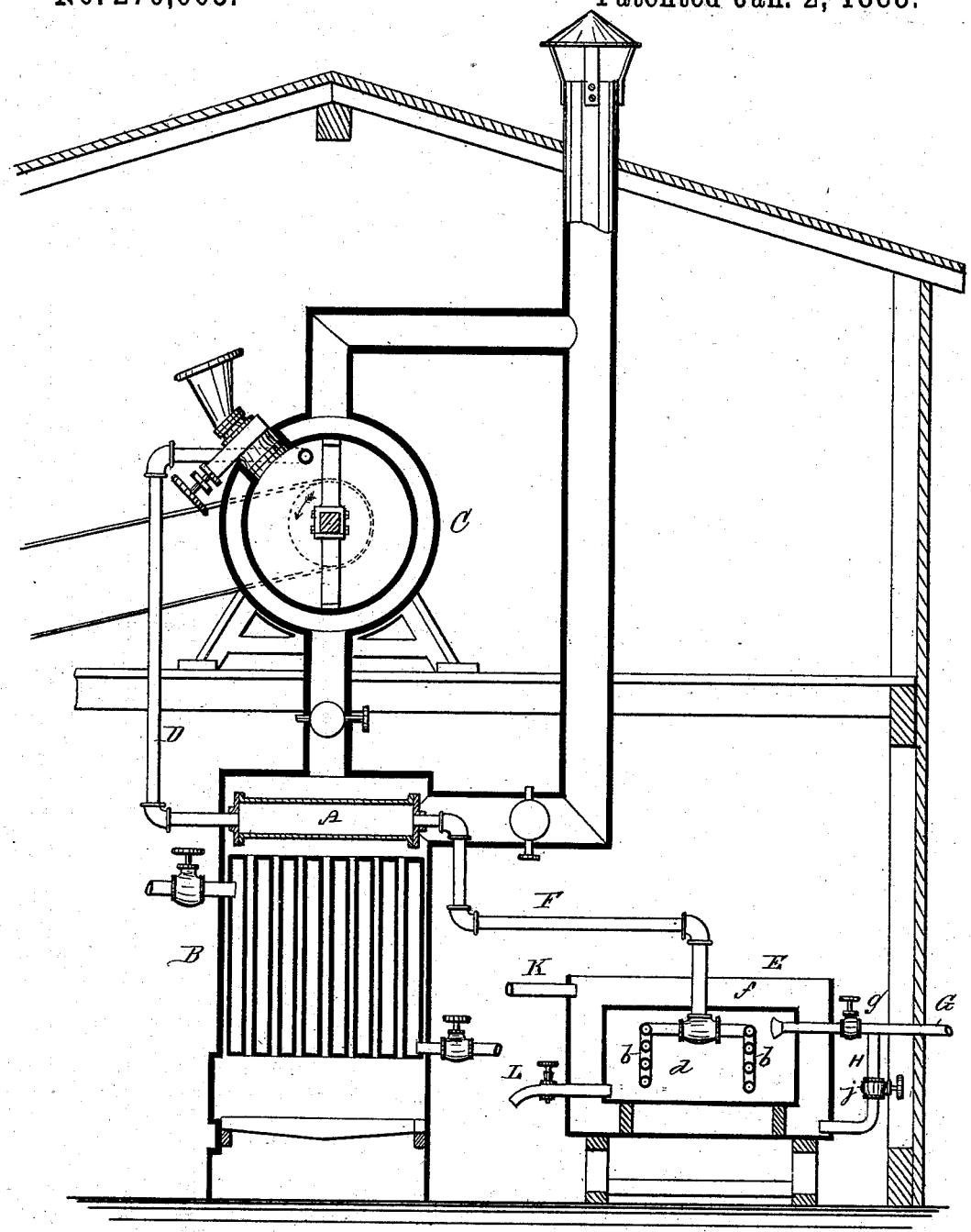
WITNESSES:
INVENTOR:
BY
ATTORNEYS.

UNITED STATES PATENT OFFICE.

JOSEPH N. B. BOND, OF NEW YORK, N. Y., ASSIGNOR TO JOSEPH N. B. BOND, JR., OF SAME PLACE.

APPARATUS FOR THE MANUFACTURE OF FERTILIZERS FROM OFFAL, &c.

SPECIFICATION forming part of Letters Patent No. 270,003, dated January 2, 1883.

Application filed October 7, 1882. (No model.)

*To all whom it may concern:*

Be it known that I, JOSEPH N. B. BOND, of the city, county, and State of New York, have invented certain new and useful Improvements in Apparatus for the Manufacture of Fertilizers from Offal and other Refuse Substances, of which the following is a full, clear, and exact description.

The invention consists in the particular means by which I bring gases and vapors into a liquid form and ready for use as a fertilizer, as hereinafter described and claimed.

In the apparatus shown and described in said patent the condenser to which the vapors and gases from the drying-chamber pass is of such form that the same are mingled with water and pass off with the water to the sewer. I have discovered that the condensable matter thus mixed with the water and wasted is valuable, and may be utilized as a liquid fertilizer.

My invention therefore consists of the process of condensing and saving the gases and vapors that form this liquid fertilizer, and also in attaching to the apparatus shown and described in the said Letters Patent a condenser having such construction that the gases and vapors generated in the drying-chambers may be condensed and saved.

The invention further consists in the improved article produced.

Reference is to be had to the accompanying drawing, forming part of this specification, in which the figure is a sectional elevation of my improved apparatus for treating offal, &c.

The decomposing-retort A is placed in the smoke-chamber of the furnace B, and is connected with the drier C by the pipe D, and with the condenser E by the pipe F, in the same manner as shown and described in the above-mentioned patent, and the retort A is to be filled with small pieces of copper, iron, coke, or other suitable material, the same as described in said patent. The condenser E is composed of the closed chamber $d$, and the surrounding water-box $f$, by means of which the chamber $d$ may be entirely submerged in water. The pipe F leads from the decomposing-retort A into the chamber $d$, and may or may not be provided with the distributing-pipes $b$, as desired. The pipe G, through which water is supplied to the condenser, passes through the water-box $f$ into the chamber $d$, and it is provided, near the box $f$, with the cock $g$, and in rear of this cock with the branch pipe H, which leads down into the water-box $f$, and this branch pipe H is provided with a cock, as shown at $j$. K is the overflow-pipe of the water-box $f$, and L is the pipe through which the contents of the chamber $d$ may be drawn off.

In operation the vapors and gases generated in the drying-chamber C will pass through the pipe D, retort A, and pipe F into the chamber $d$, where they may be condensed by issuing into a body of water supplied to the chamber by opening the cock $g$, or by a supply of water admitted to the water-box $f$ by opening the cock $j$ and closing cock $g$; or both of these means of condensation may be employed at the same time, if desired. When the chamber $d$ becomes full of condensed matter the same will be drawn off through the pipe L and saved.

The condensed products obtained from the drying-chamber in the manner hereinbefore described are rich in fertilizing properties, and of much value. Their collection not only effects an important economy in the working of the process, but prevents the escape of foul odors from the apparatus.

The employment of the ordinary offal and refuse treating apparatuses, by reason of the disgusting smells which they generate, renders them dangerous to health and a nuisance to the public. By the use of these improvements the disadvantages named are overcome, all bad odors are suppressed, and a new and valuable product is obtained.

The apparatus and process herein described are intended for use in the treatment, extraction, and condensation of fertilizing vapors and gases from all descriptions of refuse, offals, excrements, fats, vegetable and animal substances of whatever kind.

I do not limit or confine myself to the exact form or position of any of the parts herein shown, as they may be varied without departing from my invention.

Having thus described my invention, what I claim as new, and desire to secure by Letters Patent, is—

The combination, with a water-box, $f$, of an inclosed and submerged gas-tight chamber, $d$, provided with a gas and vapor supply pipe, F, whereby the gases and vapors are brought into a liquid form, ready for use as a fertilizer, as described.

JOSEPH N. B. BOND.

Witnesses:
EDGAR TATE,
C. SEDGWICK.